United States Patent
Goto et al.

[19]

[11] Patent Number: 6,137,781
[45] Date of Patent: Oct. 24, 2000

[54] COMMUNICATION NETWORK SYSTEM

[75] Inventors: Toshiyasu Goto, Hadano; Naoya Ikeda, Ebina; Hiroshi Sekino, Isehara, all of Japan

[73] Assignees: Hitachi, Ltd., Tokyo; Hitachi Information Technology Co., Ltd., Kanagawa-ken, both of Japan

[21] Appl. No.: 08/832,275

[22] Filed: Apr. 3, 1997

[30] Foreign Application Priority Data

Apr. 5, 1996 [JP] Japan .................................. 8-083829

[51] Int. Cl.$^7$ .................................................. H04L 12/28
[52] U.S. Cl. ........................................................ 370/255
[58] Field of Search .................................. 370/255, 256, 370/257, 258, 254, 401, 402, 400, 403, 404, 396, 398; 395/200.5, 200.51, 200.52

[56] References Cited

U.S. PATENT DOCUMENTS

| 5,283,897 | 2/1994 | Georgiadis et al. ................. 395/650 |
| 5,490,252 | 2/1996 | Macera et al. ................. 395/200.01 |
| 5,509,006 | 4/1996 | Wilford et al. ........................... 370/60 |
| 5,517,620 | 5/1996 | Hashimoto et al. ................ 395/200.15 |
| 5,644,713 | 7/1997 | Makishima ......................... 395/200.01 |
| 5,654,958 | 8/1997 | Natarajan ................................. 370/94.1 |
| 5,680,116 | 10/1997 | Hashimoto et al. .................... 340/827 |

*Primary Examiner*—Ajit Patel
*Assistant Examiner*—Brian Nguyen
*Attorney, Agent, or Firm*—Mattingly, Stanger & Malur

[57] ABSTRACT

A communication network system includes a plurality of networks interconnected via a plurality of relaying stations each performing a program controllable process to relay communication data, the program controllable process comprises a routing table having route information for determining a route to transfer the communication data, a learning processing unit exchanging the route information contained in the routing table among the individual relaying stations in accordance with the route information of the routing table to acquire the route information by the exchange, and a route information transform processing unit for transforming the route information contained in the routing table as acquired by the learning step into route information non-exchangeable among the individual relaying stations.

11 Claims, 14 Drawing Sheets

FIG. 2

| DESTI-NATION (71) | NEXT HOP (72) | DYNAMIC FLAG (73) | TIME (74) | LEARNED PORT ID NUMBER (75) |
|---|---|---|---|---|
| 11 | 11 | — | — | 0 |
| 12 | 12 | — | — | 1 |
| 13 | 13 | — | — | 2 |
| 23 | 12 | 1 | — | 1 |
| 22 | 12 | 1 | — | 1 |
| 33 | 13 | 1 | — | 2 |

FIG. 3

| | | | | |
|---|---|---|---|---|
| PORT ID NUMBER (81) | 0 | 1 | 2 | 3 |
| NETWORK ID NUMBER (82) | 100 | 200 | 300 | 400 |
| NODE ID NUMBER (83) | 00-00-87-e0-27-50 | 00-00-87-e0-27-51 | 00-00-87-e0-27-52 | 00-00-87-e0-27-53 |
| RIP TRANSMISSION FLAG (84) | TRANSMISSION (1) | SUPPRESSION (0) | TRANSMISSION (1) | TRANSMISSION (1) |
| PORT STATE FLAG (85) | ENABLE (1) | DISABLE (0) | ENABLE (1) | ENABLE (1) |
| ROUTE-INFORMATION EXCHANGE FLAG (86) | 1 | 0 | 1 | 0 |

FIG. 14A

DYNAMIC ROUTING TABLE 70a

| DESTINATION 71a | NEXT HOP 72a | EXCHANGING TIME 74a | LEARNED PORT ID NUMBER 75a |
|---|---|---|---|
| 11 | 11 | — | 0 |
| 12 | 12 | — | 1 |
| 13 | 13 | — | 2 |
| 23 | 12 | 20 | 1 |
| 22 | 12 | 20 | 1 |
| 33 | 13 | 20 | 2 |

FIG. 14B

STATIC ROUTING TABLE 70b

| DESTINATION 71b | NEXT HOP 72b | EXCHANGING TIME 74b | LEARNED PORT ID NUMBER 75b |
|---|---|---|---|
| 11 | 11 | — | 0 |
| 12 | 12 | — | 1 |
| 13 | 13 | — | 2 |
|  |  |  |  |
|  |  |  |  |
|  |  |  |  |

COMMUNICATION NETWORK SYSTEM

BACKGROUND OF THE INVENTION

The present invention relates to a communication network system including relaying stations for inter-connecting a plurality of networks. More particularly, the invention is concerned with a communication network system in which exchange or transfer of route information between or among the relaying stations is suspended, i.e., dynamic routing mode is changed over to static routing mode, when predetermined conditions are satisfied.

In the relaying control carried out by the relaying station (which may also be referred to as the repeater station) in the communication system such as mentioned above, there is adopted a dynamic routing control, a static routing control or a hybrid control corresponding to combination of both the above-mentioned controls.

A dynamic routing process is described, for example, in T. Tanimura's "Practical Techniques Of UNIX-LAN Architecture" published by Soft Research Center Company of Japan, p. 221.

Parenthetically, with the terms "dynamic routing", it is contemplated to mean such a system or scheme in which the relaying stations exchange route information (i.e., information concerning the routes via which communication data are to be transferred) with one another periodically at a predetermined time interval, wherein in each of the relaying stations, the route information as updated by the exchange is recorded in a route information table provided in each station together with information concerning the times of the exchange.

On the other hand, a static routing process is also described in the same literature as mentioned above (see p. 219).

According to the static routing scheme, the route information is set up by the user and registered in an associated routing table without exchanging the route information among the relaying stations. Thus, predetermined routes are always selected.

In general, the route information used in the static routing is registered by the manager or user of the relaying station. Upon registration, the route information for the destinations is searched and inputted manually, whereupon effectiveness of the route information is checked or confirmed.

SUMMARY OF THE INVENTION

An object of the present invention is to provide techniques which allow the static route information to be set up or established without difficulty.

In view of the above and other objects which will become apparent as the description proceeds, there is provided according to a general aspect of the present invention a communication network system including a plurality of networks interconnected via a plurality of relaying stations (which may also be referred to as the repeating stations) for relaying or repeating communication data, wherein each of the relaying stations includes a routing table containing route information for determining a route via which the communication data is to be transferred or transmitted, a learning processing unit for acquiring information concerning the routes by learning the route information in the course of exchanging the route information contained in the routing table between or among the individual relaying stations on the basis of the route information, and a route information transform processing unit for transforming the route information contained in the routing table as acquired by learning into route information not to be exchanged between or among the individual relaying stations.

With the arrangement of the communication network system described above, the necessity for periodical exchange of the route information between or among the relaying stations can be obviated, which is effective for reducing the fees charged for fruitless communication about the periodical route information exchange in a WAN (Wide Area Network) in which a charging or accounting system is adopted. Furthermore, when a relaying station is to be replaced due to occurrence of a fault or for some other reason, the dynamic routing table used for executing periodically the exchange of the route information can easily be suspended and replaced by a static routing table.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

FIG. 2 is a view illustrating a structure of a routing table used in the communication systems according to the invention;

FIG. 3 is a view illustrating a structure of a port management table used in the communication systems according to the invention;

FIG. 14A is a view illustrating a dynamic routing table which may be used in carrying out the invention;

FIG. 14B is a view illustrating a static routing table which may be used in carrying out the invention.

DESCRIPTION OF THE PREFERRED EMBODIMENTS

Now, the present invention will be described in detail in conjunction with reference to the drawings.

The present invention is concerned with transformation of the route information changing dynamically into static route information by program controllable processings, to thereby obviate or suspend exchange of the route information.

EMBODIMENT 1

A first embodiment of the invention is directed to a communication network system which is assumed to include two relaying stations each equipped with a console for transforming the route information that is changed dynamically into static route information for thereby obviating the necessity of exchanging the route information.

Figure 1:
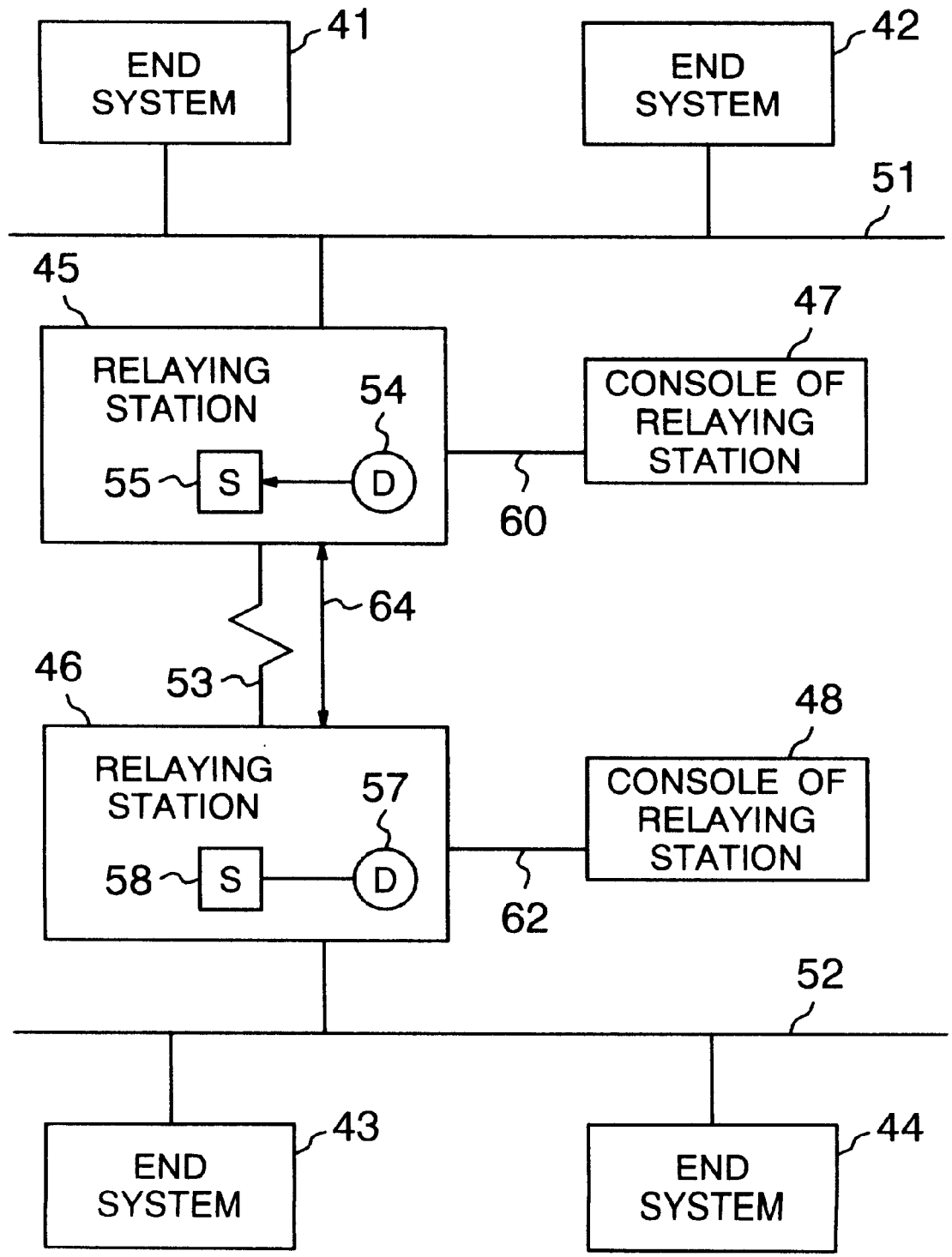
FIG. 1 is a block diagram showing generally and schematically a configuration of a communication network system according to a first embodiment of the present invention.

FIG. 1 is a block diagram showing generally and schematically a configuration of a communication network system according to a first embodiment of the present invention.

In FIG. 1, reference numerals 41 and 42 denote end systems, respectively, connected to a network 51 while numerals 43 and 44 denote end systems, respectively, connected to a network 52. The networks 51 and 52 in turn are mutually interconnected by the relaying stations 45 and 46 for exchanging or transferring the route information via a WAN (Wide Area Network) circuit 53.

Further, consoles 47 and 48 provided in association with the relaying stations 45 and 46, respectively, and connected thereto via CSM/CD LAN (Carrier Sense Multiple Access with Collision Detection Local Area Network). The consoles 47 and 48 serve for loading configuration definition information for the associated relaying stations as well as for inputting commands intrinsically dedicated to these relaying stations.

The networks 51 and 52 are connected to each other by way of the relaying stations 45 and 46, wherein it is assumed that exchange of the dynamic route information is carried out as indicated by a double-head arrow 64 in FIG. 1.

The route information exchange 64 in the communication network system according to the first embodiment of the invention is realized by inputting a relevant command at the console 47, 48 for thereby generating in the relaying station 45, 46 route information 54, 57 which changes dynamically.

More specifically, generation of the dynamically changing route information changing dynamically is realized by writing information concerning the route information in a routing table 70 shown in FIG. 2 and a port management table 80 shown in FIG. 3 both of which are incorporated in each of the relaying stations 45 and 46.

Suspension or stoppage of the exchange 64 of the route information is validated by rewriting the information contained in the routing table 70 and the port management table 80 by inputting relevant command 60, 62 from the console 47, 48 of the relaying station 45, 46 or with the aid of GUI (Graphic User Interface) provided in association with the relaying station 45, 46, to thereby replace the dynamically changing route information 54, 57 by static route information 55, 58 in the relaying station 45, 46.

More specifically, referring to FIG. 2, the routing table 70 contains information or data concerning destination 71, next hop 72 indicating network addresses, dynamic flag 73 indicating whether exchange of the route information is to be performed, route information exchanging time 74, and learned port ID (identification) number 75 learned in the course of exchange of the route information. On the other hand, the port management table 80 contains information or data concerning port ID number 81, network ID number 82, node ID number 83, RIP transmission flag 84, port state flag 85 and route information exchange flag 86, as can be seen in FIG. 3.

Next, description will be directed to a procedure for suspending the exchange of the route information between the relaying stations 45 and 46 of the communication network system according to the first embodiment of the present invention.

Figure 4:
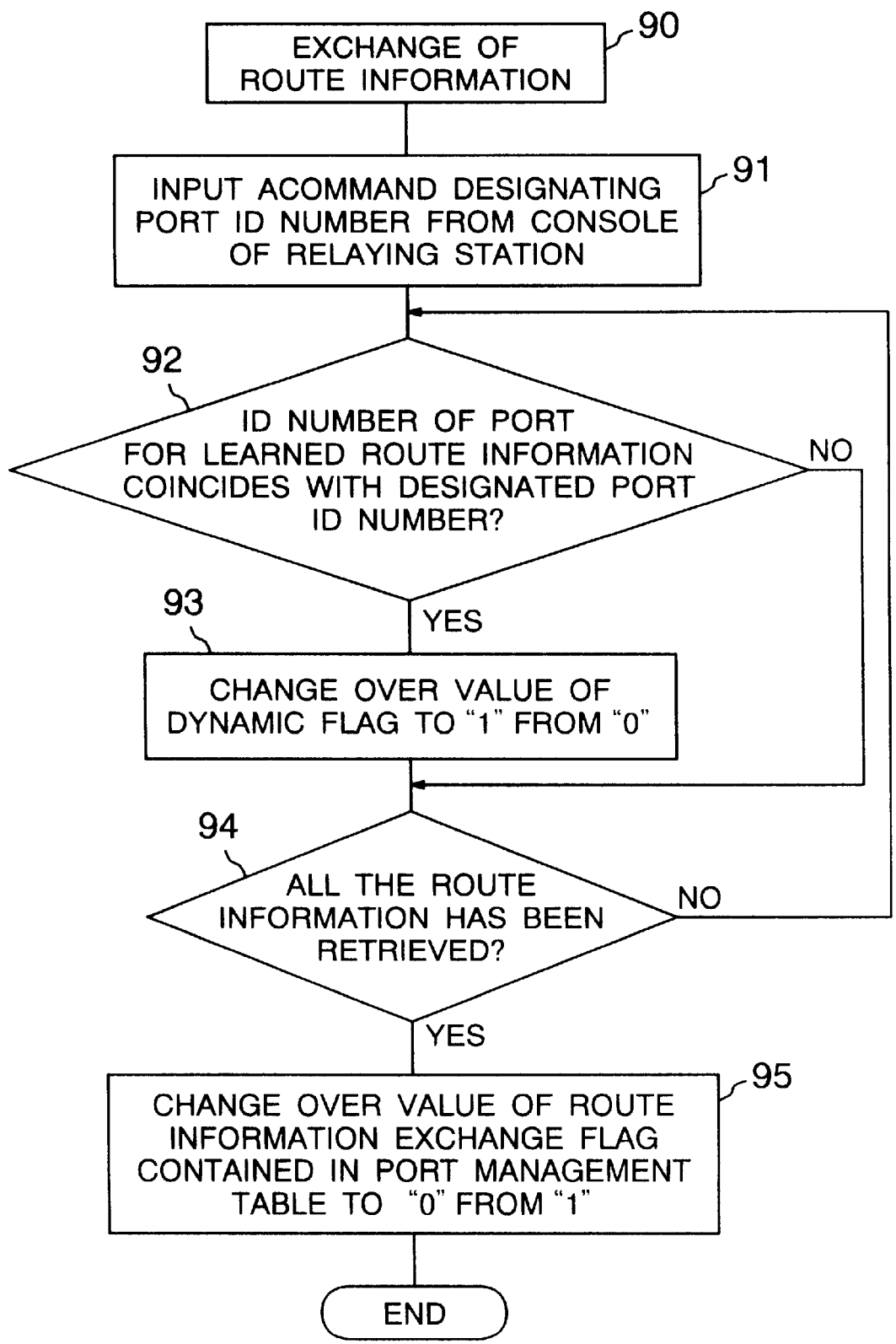
FIG. 4 is a flow chart illustrating a procedure for suspending route information exchange between relaying stations in the communication network system shown in FIG. 1.

FIG. 4 is a flow chart illustrating a procedure of suspending exchange of route information between the relaying stations 45 and 46 in the communication network system according to the first embodiment of the invention.

Ordinarily, exchange of the route information is periodically performed between the relaying stations 45 and 46 (see step 90 in FIG. 4). When the relaying station 45, 46 receives from the associated console 47, 48 a transformation indicating message (port ID number) generated by inputting a command designating the port ID number (step 91), the routing table 70 shown in FIG. 2 is referenced to make decision whether the port ID number contained in the received message coincides with the learned port ID number 75 for the route information (step 92). When coincidence is found between both the port ID numbers, then the value of the dynamic flag 73 contained in the routing table 70 is changed over to "1" from "0" (step 93).

Subsequently, it is decided whether all the routing tables 70 have been searched (step 94). If not, the next routing table 70 is checked, while if otherwise, the value of the route information exchange flag 86 for the designated port as contained in the port management table 80 shown in FIG. 3 and incorporated in the relaying station 45, 46 is changed over to "0" from "1" (step 95) to thereby allow the dynamically changing route information to be replaced by the static route information, whereupon the processing procedure comes to an end.

As will now be appreciated from the foregoing, the learned route information contained in the routing table is replaced by (or rewritten with) the route information not destined for exchange between the relaying stations upon reception of the relevant command from the associated console, whereby the route information learned in the course of the route information exchanges performed up to that time point can be set intact as the static route information, rendering it unnecessary to carry out the procedure for inspecting the route information, setting the information through manual inputting and confirming the validness of the information. Thus, the static route information can be set very easily.

On the other hand, via the WAN circuit 53 in which the exchange of the dynamic route information has been stopped, a frame requesting the route information may be sent to the relaying station 45, 46 by inputting a relevant command in the associated console 47, 48 or with the aid of the GUI (Graphic User Interface), whereupon the relaying station 45, 46 may responds the request mentioned above by transforming the existing or current static route information by the one containing newly learned route information or edit, add and/or delete the static route information in the console terminal 47, 48, as is indicated by reference numeral 60 and 62 in FIG. 1.

EMBODIMENT 2

A second embodiment of the invention is directed to a communication network system which includes two relaying stations and a single console for transforming the dynamically changing route information into static route information for thereby suspending the exchange of the route information.

Figure 5:
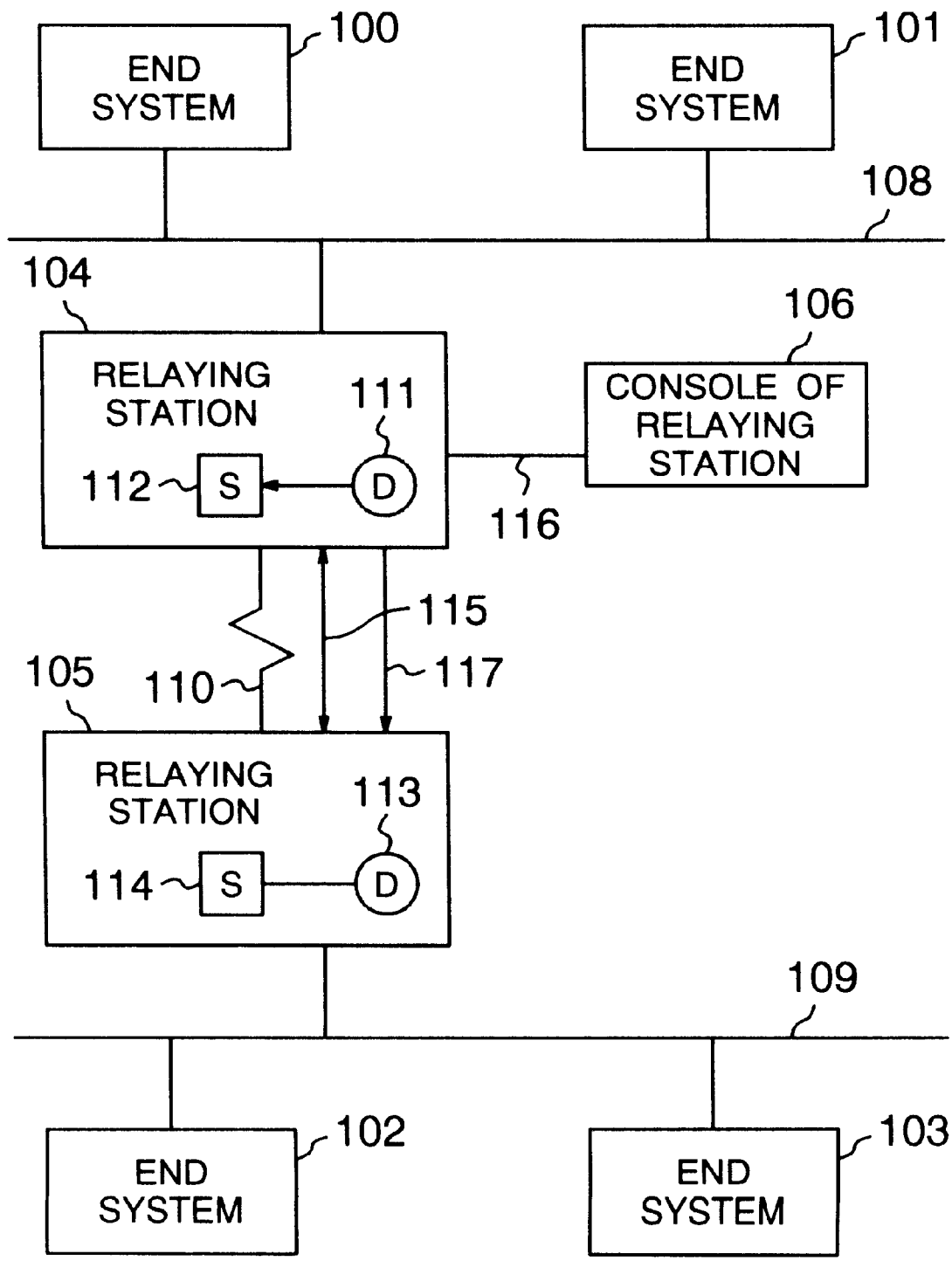
FIG. 5 is a block diagram showing generally and schematically a configuration of the communication network system according to a second embodiment of the invention.

FIG. 5 is a block diagram showing generally and schematically a configuration of the communication network system according to the second embodiment of the present invention.

In FIG. 5, reference numerals 100 and 101 denote end systems, respectively, connected to a network 108 while numerals 102 and 103 denote end systems, respectively, connected to a network 109. The two networks 108 and 109 are interconnected through a relaying station 104, a WAN circuit 110 and a relaying station 105.

The relaying station 104 is equipped with a console 106 which is connected to the relaying station 104 by way of an RS-232C interface or Ethernet.

Further, the networks 108 and 109 are mutually connected or interconnected through the medium of dynamically changing route information 111 and 113.

Suspension of the exchange of the dynamically changing route information is validated by executing a relevant command in the console 106 or an instruction 116 inputted through a GUI (Graphic User Interface) provided in association with the console 106, whereby frames unique to the relaying stations 104 and 105 are transferred between them, for thereby replacing the dynamically changing route information 111 by the static route information 112. More specifically, when the relaying station 105 receives the unique frame from the relaying station 104, the dynamically changing route information 113 is replaced by the static route information 114. At this juncture, it should be mentioned that with the terms "unique frame", it is intended to mean the frames used between only the relaying stations 104 and 105 and not standardized.

Next, description will be directed to a procedure for stopping exchange of the route information between the relaying stations 104 and 105 in the communication network system according to the second embodiment of the invention.

Figure 6:
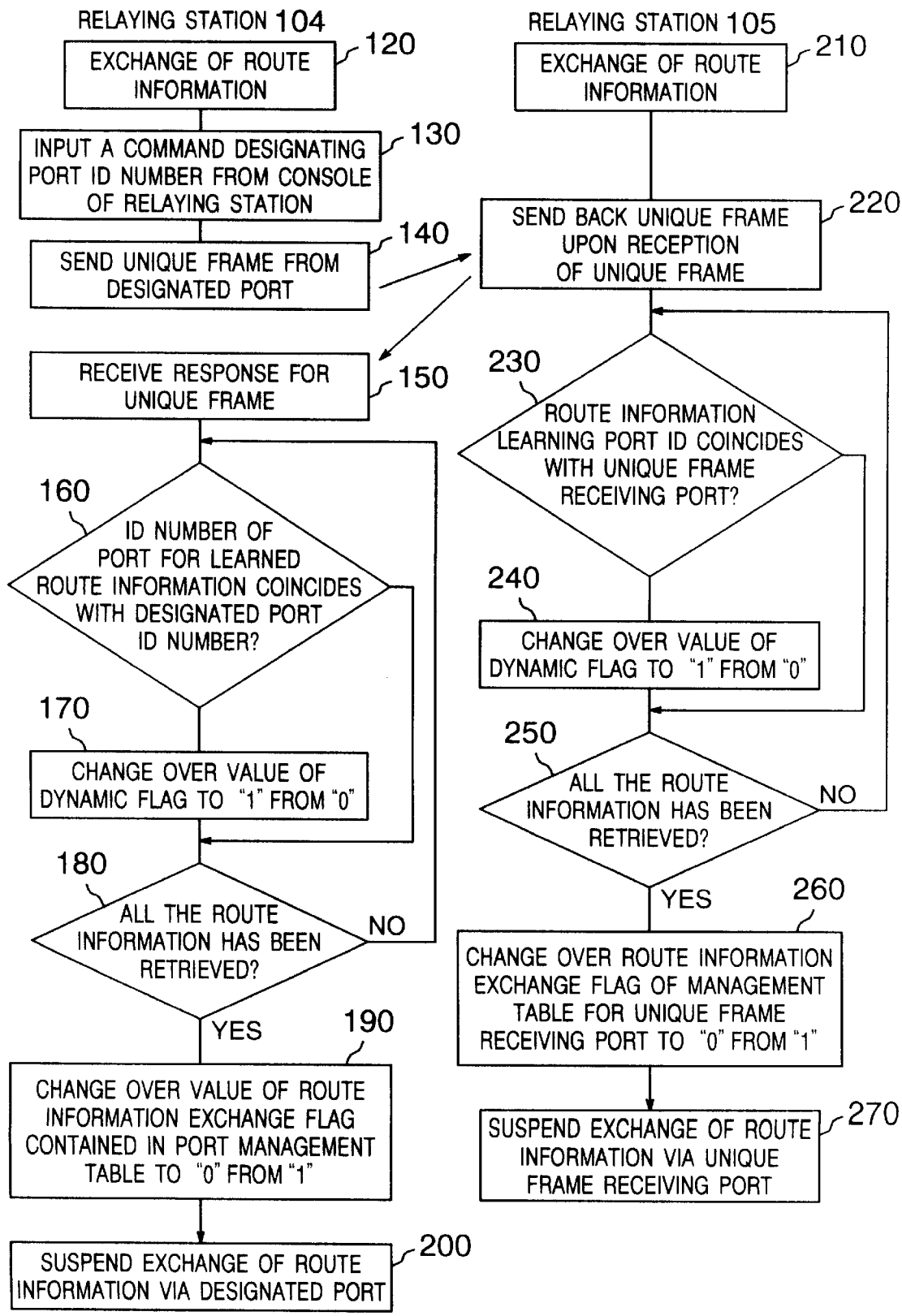
FIG. 6 is a flow chart illustrating a procedure for suspending or stopping route information exchange between relaying stations in the communication network system shown in FIG. 5.

FIG. 6 is a flow chart illustrating a procedure for suspending the exchange of the route information between the relaying stations 104 and 105 in the communication network system according to the second embodiment of the invention.

Ordinarily, exchange of the route information is periodically performed between the relaying stations 104 and 105 (see steps 120 and 210 in FIG. 6). When the relaying station 104 receives from the associated console 106 a transformation indicating message containing a command designating a port ID number as inputted at the console 106 (step 130), then the relay station 104 sends a unique frame to a port of the counterpart relaying station 105 connected to the designated port mentioned above (step 140). Upon reception of a unique frame from the relaying station 105 as response (step 150), the routing table 70 shown in FIG. 2 is referenced with regard to the relevant port ID number to make decision whether the port ID number contained in the received message coincides with the learned port ID number 75 for the route information (step 160). When coincidence is found between both the port ID numbers, then the value of the dynamic flag 73 contained in the routing table 70 is changed over to "1" from "0" (step 170).

Subsequently, it is decided whether the search has been performed for all the routing tables 70 (step 180). If not, the next routing table 70 is checked, while if otherwise, the value of the route information exchange flag 86 for the designated port as contained in the port management table 80 shown in FIG. 3 is changed over to "0" from "1" to thereby allow the dynamically changing route information to be replaced by or rewritten with the static route information (step 190), whereby the exchange of the route information via the designated port is suspended (step 200).

On the other hand, when the relaying station 105 receives the unique frame from the relaying station 104 (step 220), it is decided in the relaying station 105 whether the port ID number contained in the unique frame received from the relaying station 104 coincides with the learned port ID number 75 by consulting the routing table 70 shown in FIG. 2 (step 230). When coincidence is found, the value of the dynamic flag 73 contained in the routing table 70 shown in FIG. 2 is changed over to "1" from "0" (step 240).

Subsequently, it is decided whether all the routing tables 70 have been searched (step 250). If not, the next routing table 70 is checked. On the contrary, when all the routing tables have been checked, the value of the route information exchange flag 86 for the unique frame receiving port as contained in the port management table 80 shown in FIG. 3 is changed over to "0" from "1", for thereby allowing the dynamically changing route information to be replaced by the static route information (step 260), whereupon the exchange of the route information via the unique frame receiving port is suspended or stopped (step 270).

Figure 7:
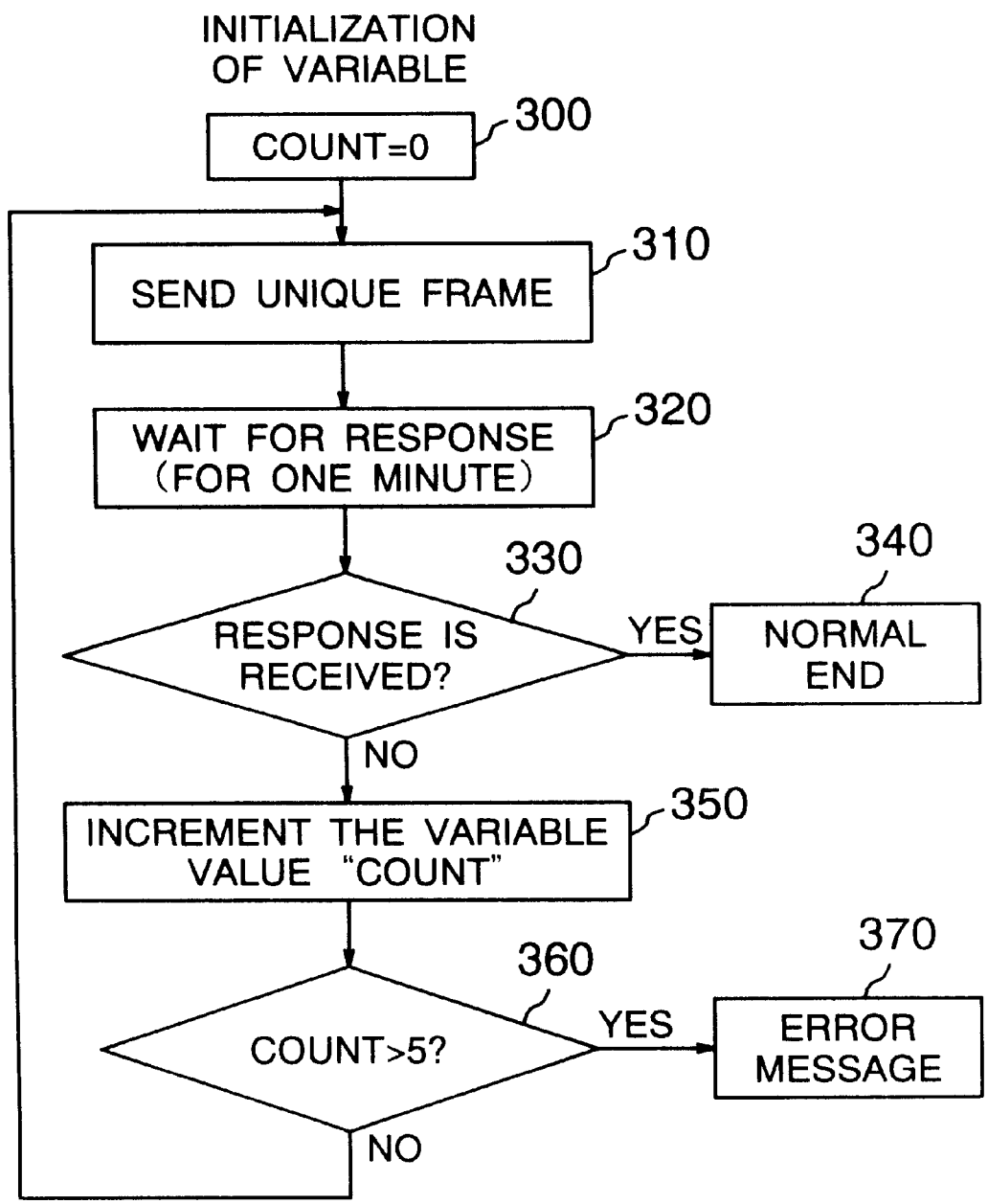
FIG. 7 is a flow chart illustrating a procedure for sending a unique frame.

Referring to FIG. 7, in the procedure for sending the unique frame, initialization of variable (count=0) is first executed (see step 300 in FIG. 7), being followed by a step 310 where the unique frame is sent. Thereafter, response is waited for in a step 320. Although the waiting time can be set arbitrarily, it is assumed in the case of the instant embodiment that the waiting time is set to one minute.

In a step 330, it is checked whether the response is received. If so, it is decided that the unique frame sending procedure has been carried out normally.

On the other hand, unless the response is detected, the variable "count" is incremented by one in a step 350. So long as the count value is smaller than "5" inclusive" (step 360), the step 310 is resumed, whereas when it is decided that the count value is greater than "5" (step 360), an error message is issued (step 370).

As can now be understood from the foregoing, by sending a unique frame indicating stoppage or suspension of the route information exchange to the counterpart relaying station in response to the relevant command inputted through the associated console and by replacing the learned route information contained in the routing table by the route information not destined for exchange between the relaying stations upon reception of the frame or reception of response for the frame, whereby the route information learned in the course of the route information exchanges performed up to that time point can be set intact as the static route information, rendering it unnecessary to inspect the route information, set the information through manual inputting and confirm the validity of the information. Thus, the static route information can be set very easily.

In the foregoing description of the second embodiment, it has been assumed that the number of times of the sending of the frame is limited to five. However, it goes without saying that the invention is never restricted thereto.

EMBODIMENT 3

A third embodiment of the invention is directed to a communication network system which includes two relaying stations and in which the dynamically changing route information is automatically replaced by the static route information for suspending the exchange of the route information.

Figure 8:
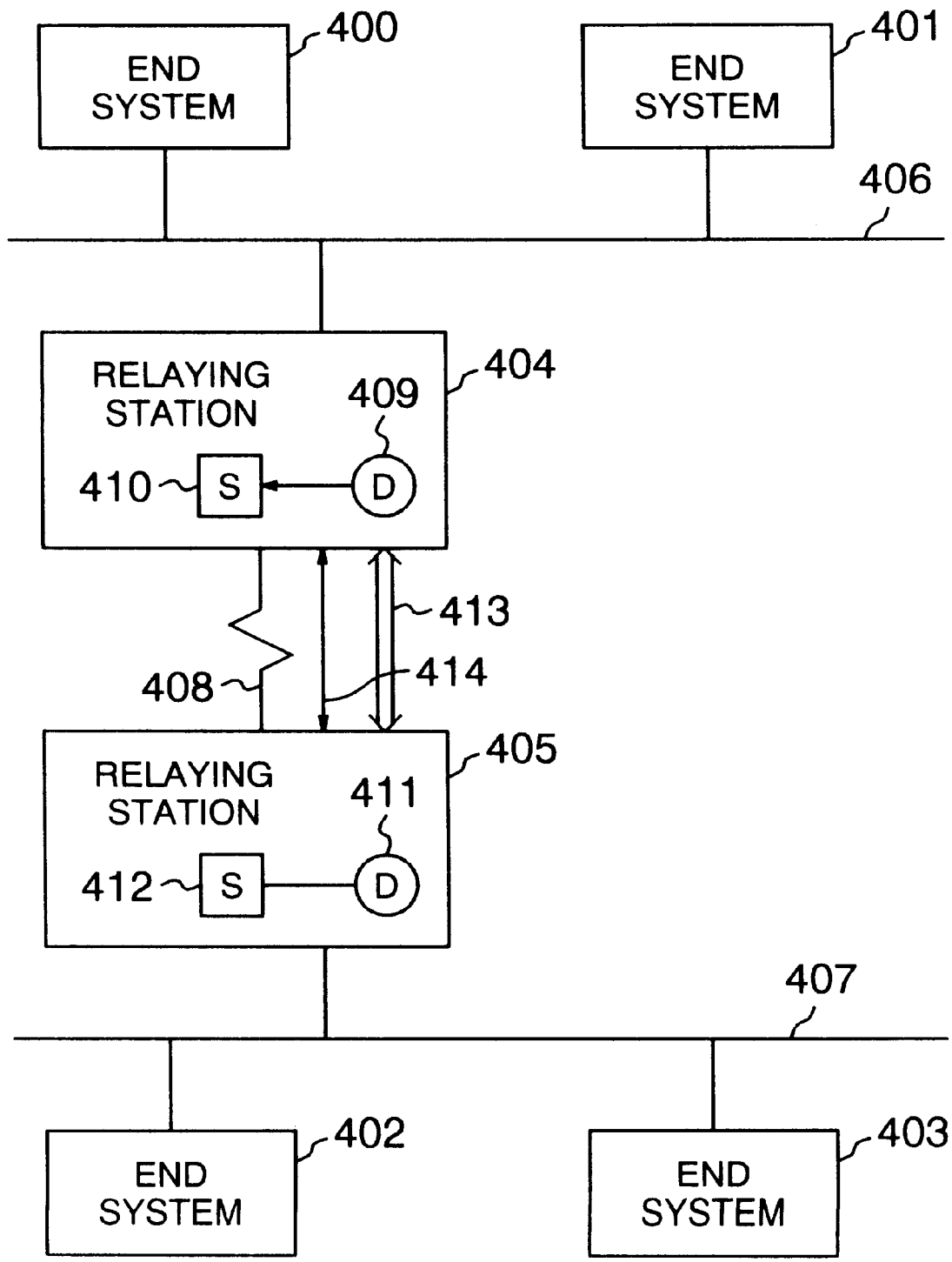
FIG. 8 is a block diagram showing generally and schematically a configuration of the communication network system according to a third embodiment of the invention.

FIG. 8 is a block diagram showing generally and schematically a configuration of the communication network system according to the third embodiment of the present invention.

In FIG. 8, reference numerals 400 and 401 denote end systems, respectively, connected to a network 406 while numerals 402 and 403 denote end systems, respectively, connected to a network 407.

The two networks 406 and 407 are interconnected through a relaying station 404, a WAN circuit 408 and a relaying station 405.

Upon completion of negotiation 413 of data link layers on the WAN circuit 408 between the relaying stations 404 and 405 with the aid of an OSI (Open Systems Inter-connection) reference model (OSI7498-1), interconnecting ports of the relaying stations 404 and 405 which serve to interconnect the two networks 406 and 407 are enabled to thereby allow exchange 414 of the route information to be performed for setting dynamically changing route information 409 in the relaying station 404 while setting dynamically changing route information 411 in the relaying station 405.

With the negation 413 mentioned above, it is contemplated to mean operation for matching the conditions for communication such as maximum reception unit length, compression of protocol filed, confirmation of authentication protocol to be adopted and the like.

Further, in order that the conditions for enabling the interconnecting ports are to be met, it is required that the interconnecting ports are in the state basically enabling the communication. By way of example, it is required that port for router is capable of operating with initialization thereof having been completed, no isolation takes place, no circuit failure occurs, negotiation has been completed, and so forth.

Exchange 414 of the route information is stopped or suspended by replacing the dynamically changing route information 409 and 411 by the static route information 410 and 412 in the relaying stations 404 and 405, respectively, when a predetermined time has lapsed after enabling of the interconnecting ports.

The predetermined time mentioned above is given, for example, by a time required for executing ten times the exchange of the route information.

Next, description will be directed to a procedure for suspending the exchange of the route information between the relaying stations 404 and 405 in the communication network system according to the third embodiment of the invention.

Figure 9:
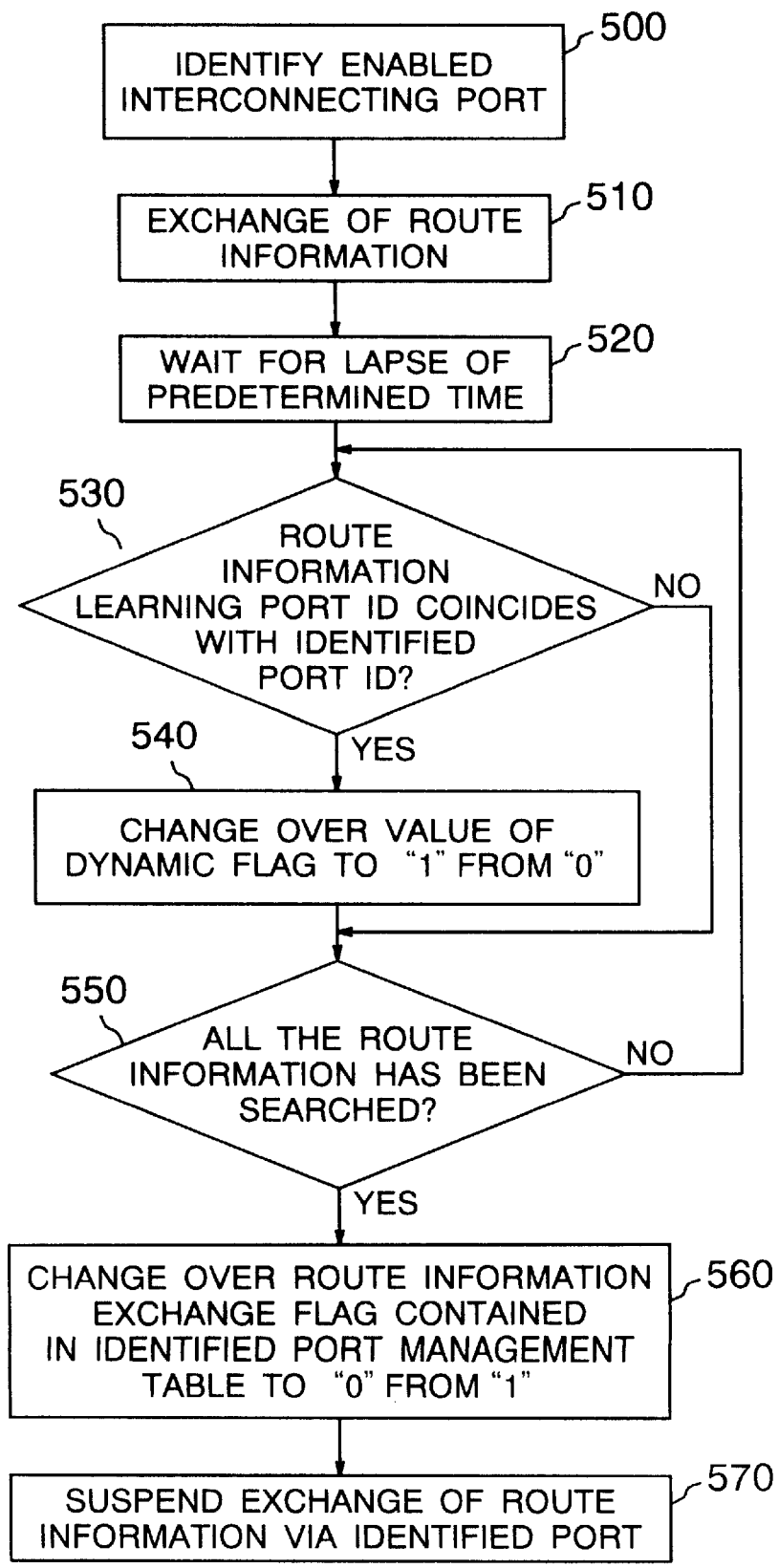
FIG. 9 is a flow chart illustrating a procedure for stopping or suspending route information exchange between relaying stations in the communication network system shown in FIG. 8.

FIG. 9 is a flow chart illustrating a procedure of suspending the exchange of the route information between the relaying stations 404 and 405 in the communication network system according to the third embodiment of the invention.

At first, ports provided for one-to-one interconnection of the relaying stations 404 and 405 are enabled after completion of the negotiation 413 of the data link layers (step 500), whereupon exchange of the route information is performed (step 510).

After lapse of a predetermined time (step 520), the ID number 75 of the port through which the route information has been learned is compared with the ID number of the enabled port (step 530). When coincidence results from the comparison, then the value of the dynamic flag 73 contained in the routing table 70 shown in FIG. 2 is changed over to "1" from "0" (step 540). On the other hand, when no coincidence is resulted from the comparison step 530, the processing proceeds to a step 550.

In the step 550, it is decided whether a search has been conducted for all the route information. If not, the step 530 is resumed. Otherwise, the value of the route information exchange flag 86 for the enabled port as contained in the port management table 80 shown in FIG. 3 is changed over to "0" from "1" (step 560), whereby the exchange of the route information through the enabled port is suspended (step 570).

As is apparent from the above, according to the invention of the third embodiment thereof, the learned route information contained in the routing tables of the relaying stations is replaced by the route information not to be exchanged between the relaying stations when a predetermined time has lapsed after enabling the inter-connecting ports in succession to completion of negotiation of the data link layers between the relaying stations, whereby the route information learned in the course of the route information exchanges performed up to that time point can be automatically set intact as the static route information, rendering it unnecessary to set the information through manual inputting. Thus, the static route information can be set very easily.

EMBODIMENT 4

A fourth embodiment of the present invention is directed to a communication network system which includes two relaying stations and in which the number of times the route information has been changed during a unit time is measured, wherein the dynamically changing route information is automatically replaced by the static route information in dependence on the number of times the route information has undergone change, for suspending the exchange of the route information.

Figure 10:
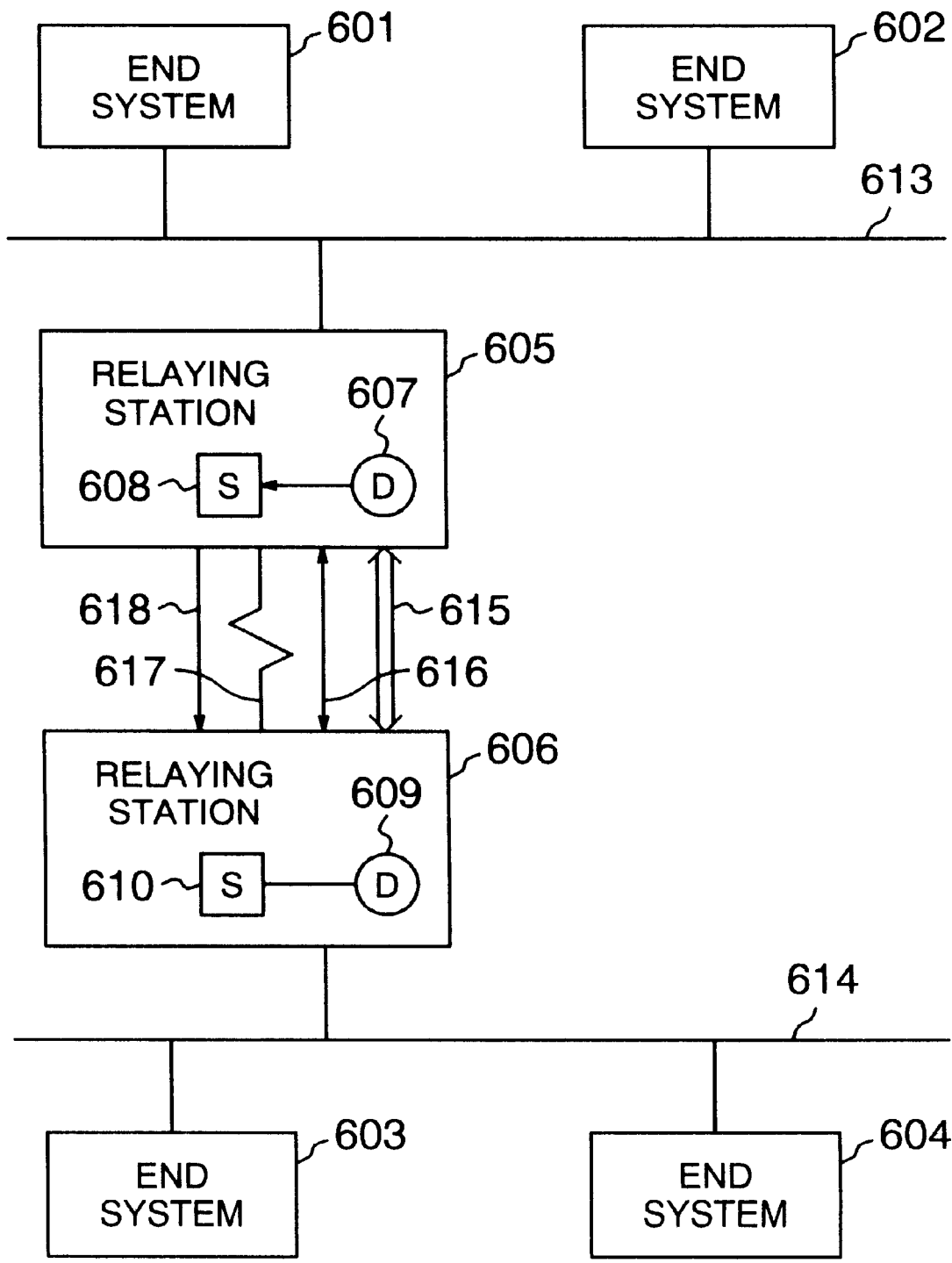
FIG. 10 is a block diagram showing generally and schematically a configuration of the communication network system according to a fourth embodiment of the present invention.

FIG. 10 is a block diagram showing generally and schematically a configuration of the communication network system according to the fourth embodiment of the invention.

As is shown in FIG. 10, the communication network system according to the instant embodiment of the invention includes a network 613 to which end systems 601 and 602 are connected and a network 614 to which end systems 603 and 604 are connected, wherein the networks 613 and 614 are interconnected by way of a WAN (Wide Area Network) circuit 617 and relaying stations 605 and 606.

As in the case of the communication network system according to the third embodiment described hereinbefore, after completion of the negotiation 615 of data link layers on the WAN circuit 617 interposed between the relaying stations 605 and 606 with the aid of the OSI reference model, exchange 616 of the route information is performed between the relaying stations 605 and 606 for interconnecting the two networks 613 and 614, for thereby setting dynamically changing route information 607 in the relaying station 605 while setting dynamically changing route information 609 in the relaying station 606.

Exchange 616 of the route information is stopped or suspended by replacing the dynamically changing route information 607 and 609 by the static route information 608 and 610 in the relaying stations 605 and 606, respectively, when the number of times the route information on the WAN circuit 617 has undergone change within a unit time attains a predetermined value. To this end, the number of times the route information has changed may be measured in the relaying station 605 by making use of an MIB (Management Information Base) or static information or the like.

Figure 11:
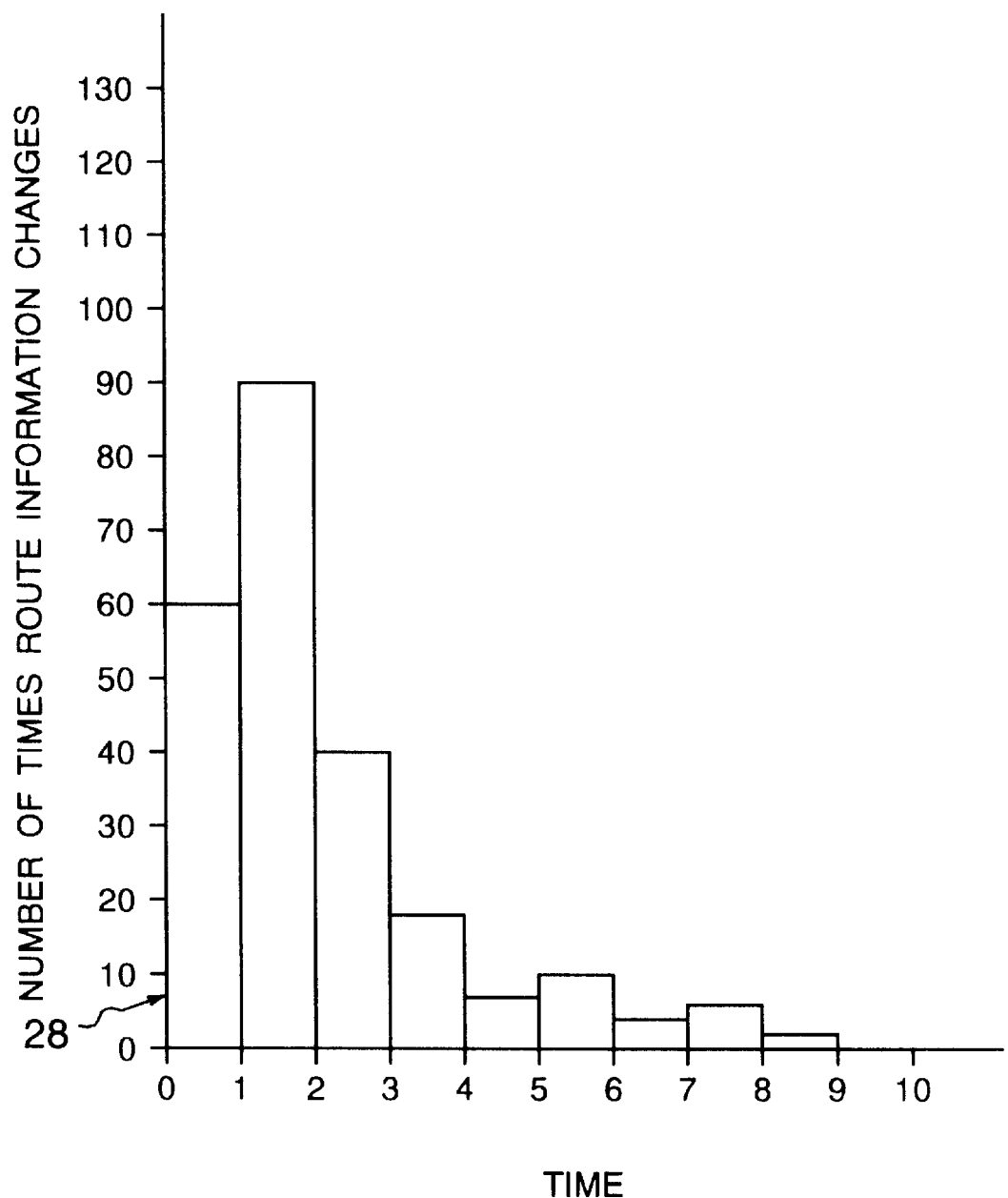
FIG. 11 is a view for graphically illustrating a number of changes which route information undergoes as a function of time lapse.

More specifically, the number of times the route information has undergone change can be measured or determined on the basis of the number of times the route information is exchanged during a period of one minute intervals as illustrated graphically in FIG. 11. When the number of changes of the route information has reached a predetermined value (designated by "28" in FIG. 11), the route information is regarded to have reach a fixed state, whereon the dynamic route information is replaced by the static route information.

Figure 12:
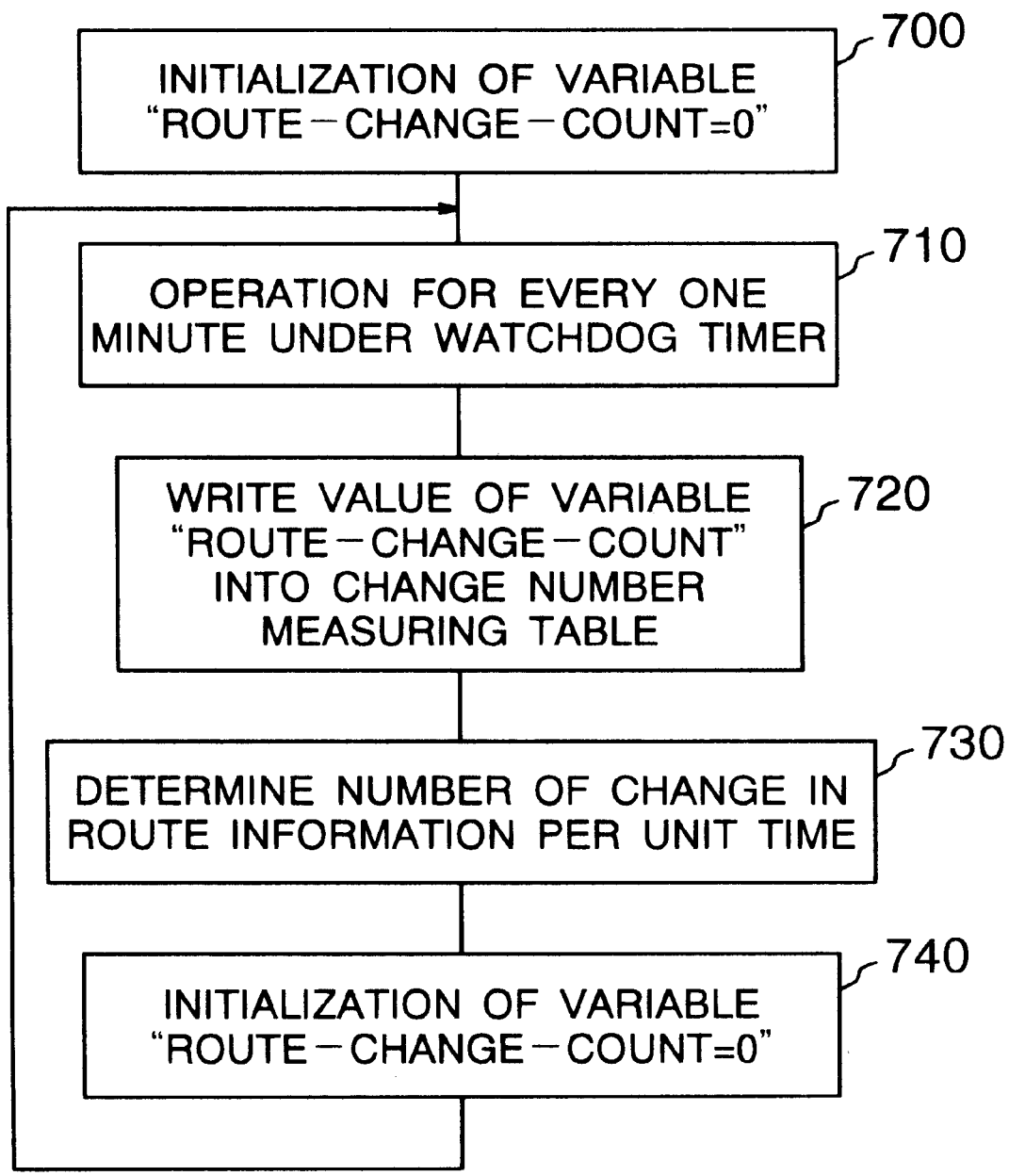
FIG. 12 is a flow chart illustrating a procedure for measuring the number of changes in the route information.

Now, referring to a flow chart shown in FIG. 12, description will be made of the measurement of the number of changes of concern. In a step 700, a variable indicating the number of changes of the route information (i.e., the number of times the route information undergoes change) and given as "route-change-count" is initialized. The system is operated for one minute by using a watchdog timer (step 710) to thereby measure the number of route information change events with the measured value (incremented value of the afore-mentioned count) being written in a change number measuring table (not shown) (step 720), which is then followed by a step 730 where the number of changes of the route information during one minute (unit time) is determined.

In a step 740, the variable is initialized, and the step 710 is resumed, whereupon the measuring procedure mentioned above is executed repetitively.

Next, description will be directed to a procedure for stopping exchange of the route information between the relaying stations 605 and 606 of the communication network system according to the fourth embodiment of the invention.

Figure 13:
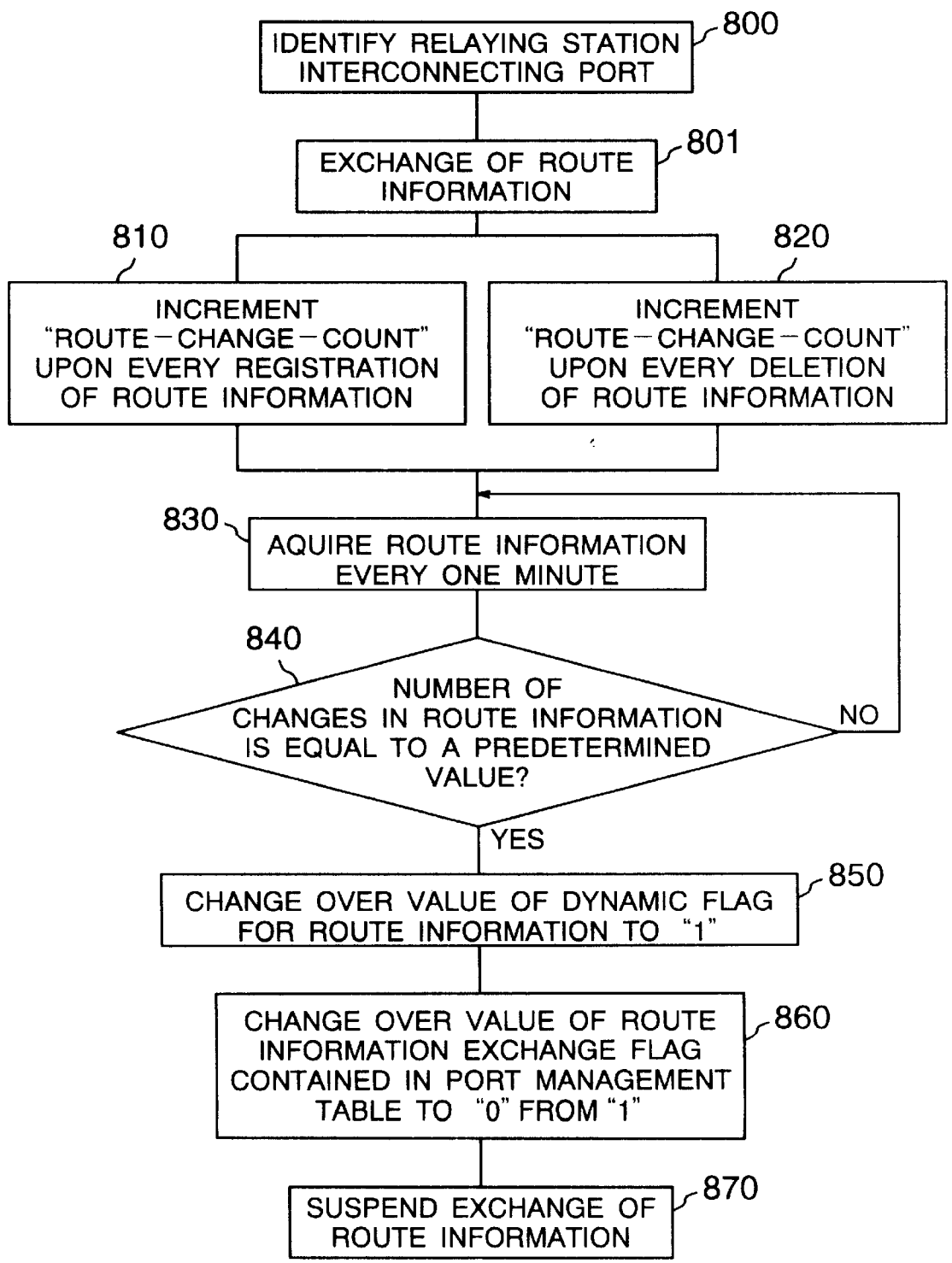
FIG. 13 is a flow chart illustrating a procedure for suspending the route information exchange between the relaying stations in the communication network system shown in FIG. 10.

FIG. 13 is a flow chart illustrating a procedure of suspending the exchange of the route information between the relaying stations 605 and 606 in the communication network system according to the fourth embodiment of the invention.

As described hereinbefore by reference to the flow chart of FIG. 9, after completion of the negotiation of the data link layers (615), the one-to-one interconnecting port of the relaying station is identified or enabled (step 800). Exchange of the route information is performed between the relaying stations 605 and 606. In that case, every time the route information is registered or deleted, the variable (i.e., the route-change-counter) is incremented (steps 810 and 820).

The number of changes of the route information during one minute is read out from the change number measuring table mentioned previously (step 830), and then decision is made as to whether the number of times the route information has undergone change (i.e., the number of changes of the route information) is equal to a predetermined value (step 840). If not, the step 830 is resumed. On the other hand, when the decision step 840 results in affirmation (Yes), then the value of the dynamic flag 73 contained in the routing table 70 shown in FIG. 2 is rewritten to "1" from "0" (step 850), while the value of the route information exchange flag 86 contained in the port management table 80 shown in FIG. 3 is changed over to "0" from "1" (step 860), whereby the exchange of the route information is suspended or stopped (step 870).

In this way, the number of changes in the exchanges of the route information with the counterpart relaying station during a unit time is measured, and when the number of changes mentioned above becomes equal to a predetermined value, a unique frame indicating stoppage of the route information exchange is sent to the counterpart relaying station as indicated by 618, whereupon the learned route information contained in the routing table is replaced or written by the route information not to be exchanged between the relaying stations upon reception of the frame or response to the aforementioned frame. Thus, the route information learned in the course of the route information exchanges performed up to that time point can automatically be set intact as the static route information, rendering it unnecessary to set the information through manual inputting, which of course means that the static route information can be set very easily.

EMBODIMENT 5

FIG. 14A shows a dynamic routing table 70*a* which has a substantially same structure as that shown in FIG. 2 and contains information or data concerning destination 71*a*, next hop 72*a*, time 74*a* taken for exchange of the route information, and learned port ID number 75*a* learned in the course of exchange of the route information. It should however be noted that the table shown in FIG. 14A contains no information concerning the dynamic flag. Further, FIG. 19B shows a static routing table 70*b* which contains the same entries as those of the dynamic routing table 70*a* shown in FIG. 14A.

By providing the dynamic routing table and the static routing table of the respective structures mentioned above suppression of exchange of the route information between the relaying stations can be realized simply by transporting the contents of the dynamic routing table to the static routing table.

Figure 15:
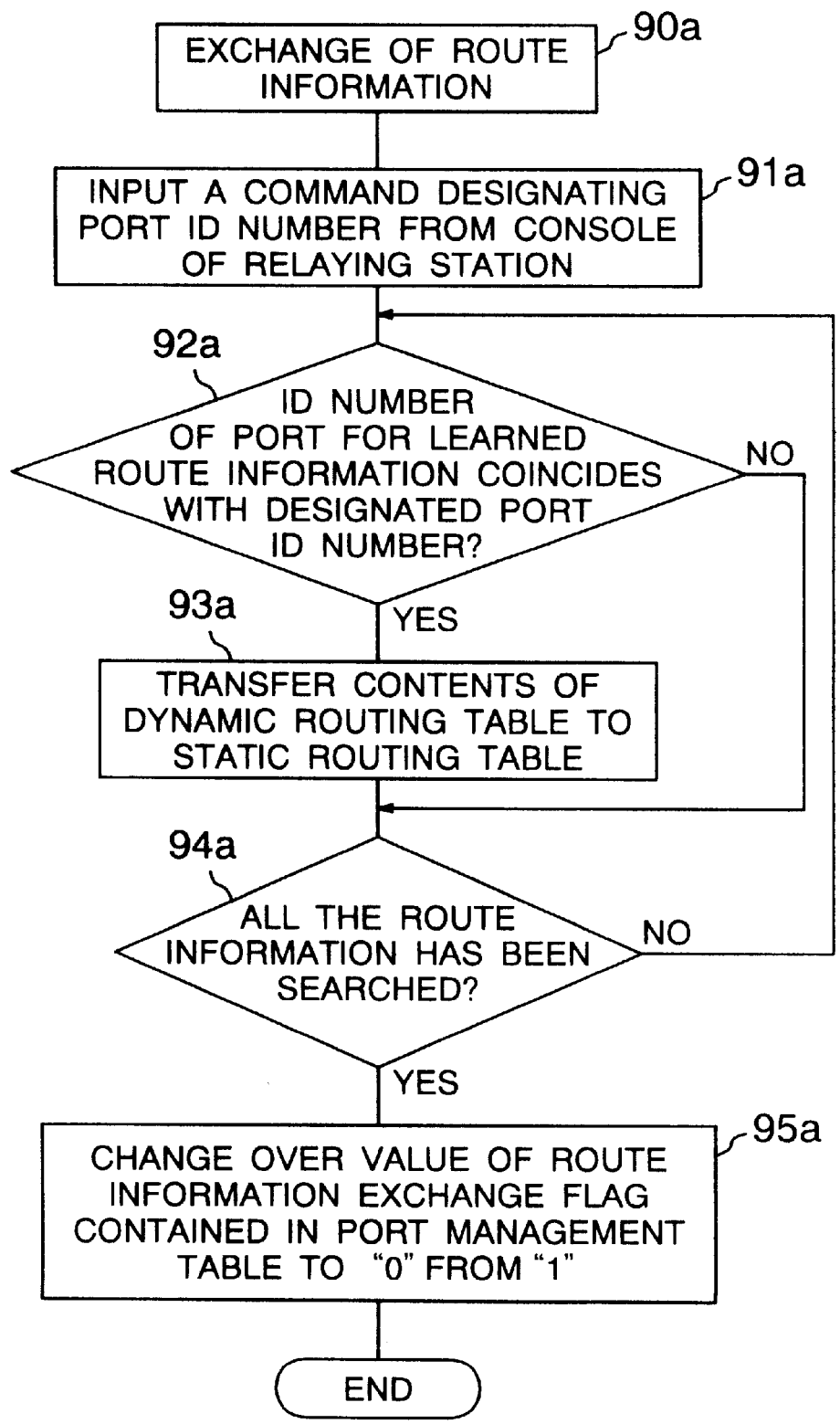
FIG. 15 is a flow chart illustrating a procedure for transforming the content of the dynamic routing table to that for the static routing table.

The procedure mentioned above will be elucidated by referring to a flow chart shown in FIG. 15 in conjunction with, for example, the communication network system shown in FIG. 1. Exchange of the route information is periodically performed between the relaying stations 45 and 46 (see step 90*a* in FIG. 15). When the relaying station 45, 46 receives from the associated console 47, 48 a port designating ID number (port ID number) generated in response to the input of a command designating the port ID number (step 91*a*), the dynamic routing table 70*a* shown in FIG. 14A is retrieved to determine the ID number of the port through which the route information has been learned and which coincides with the designated port. At that time point, the information indicated by the designated learned port ID number such as, for example, the designation "11", the next hop "11", and the time is transported to vacant regions of the static routing table 70*b* shown in FIG. 14B (see step 93*a* in FIG. 15). Subsequently, it is decided whether retrieval has been performed for all the learned port ID numbers (step 94*a*). If not, the dynamic routing table 70*a* is checked. If otherwise, the value of the route information exchange flag 86 for the designated port as contained in the port management table 80 shown in FIG. 3 and incorporated in the relaying station 45, 46 is changed over to "0" from "1" (step 95*a*), whereupon the exchange of the route information between the relaying station 45 and 46 is suspended.

Although the fifth embodiment illustrated in the flow chart shown in FIG. 15 has been described in conjunction with the communication network system shown in FIG. 1, it will readily be understood that the substantially same effect can be obtained equally in the communication network system shown in FIG. 5 by replacing the processing steps 170 and 240 shown in the flow chart of FIG. 6 by the step 93*a* shown in FIG. 15. Similarly, in the communication network system shown in FIG. 8, the step 540 in the flow chart shown in FIG. 9 may be replaced by the step 93*a* whereas in the communication network system shown in FIG. 10, the step 850 in the flow chart of FIG. 13 may be replaced by the step 93a, substantially to the same effect.

At this juncture, it should be mentioned that the processing modules or programs corresponding to the procedures described above by reference to the flow charts are resident in the relevant relaying stations, respectively.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A communication network system including a plurality of networks interconnected via a plurality of relaying stations each performing a program controllable process to relay communication data, said program controllable process comprising:

a routing table having route information for determining a route to transfer the communication data;

learning processing means exchanging the route information contained in said routing table among the individual relaying stations in accordance with the route information of said routing table to acquire the route information by the exchange;

route information transform processing means for transforming the route information contained in said routing table as acquired by the learning means into route information non-exchangeable among the individual relaying stations; and said route information transforming means comprising:

port identifying means for identifying use-enabled interconnecting ports after communication-ready state has been established between said relaying stations;

measurement processing means for measuring the number of changes in a number of times the route information has been exchanged with a counterpart relaying station per unit time period;

transmission processing means for sending a frame indicating suspension of the exchange of the route information to the counterpart relaying station with which the route information is being exchanged when the number of changes in said number of times the route information has been exchanged becomes equal to a predetermined value; and route information rewrite processing means responsive to one of reception of said frame and reception of response for said frame, to thereby replace the learned route information contained in said routing table by route information non-exchangeable between the relaying stations.

2. A communication network system according to claim 1, said transmission processing means including:

transmission/reception processing means for identifying the port to be used by said port identifying/enabling processing means to thereby send from said identified port a frame indicating suspension of exchange of said route information to a counterpart relaying station with which exchange of the route information is being carried out, and receiving a response for said unique frame from said counterpart relaying station, said route information rewrite processing means including:

retrieval processing means responsive to a predetermined value attained by the number of changes in the number of times the exchange of route information has been executed per unit time, as measured by said time measurement processing means, for thereby retrieving from said routing table said identified port;

a port management table for containing information concerning the port retrieved by said retrieval processing means; and flag change-over means for changing a route information exchange flag contained in said port management table.

3. A communication network system according to claim 2, said routing table being composed of a dynamic routing table and a static routing table, each of said dynamic routing table and said static routing table containing a destination area indicating destinations of the relaying station, a next-hop area containing next-hop information indicating a network address, an area indicating times for exchanges of the route information and a learning port identification number area containing identification numbers of ports through which the route information has been learned in the course of exchange of the route information;

wherein when the port designated by said retrieval processing means coincides with the port contained in said learning port identification number area of said dynamic routing table, then the information concerning the destination, the next hop and the times for exchanges of the route information of the relaying station relevant to said port of said learning port identification number area are transported to relevant empty areas of said static routing table from said dynamic routing table, whereby said static routing table is set as the routing table for the route information non-exchangeable among said relaying stations.

4. A communication network system including a plurality of networks interconnected via a plurality of relaying stations each performing a program controllable process to relay communication data, said program controllable process comprising:

a routing table having route information for determining a route to transfer the communication data;

learning processing means exchanging the route information contained in said routing table among the individual relaying stations in accordance with the route information of said routing table to acquire the route information by the exchange;

route information transform processing means for transforming the route information contained in said routing table as acquired by the learning means into route information non-exchangeable among the individual relaying stations;

said relaying station comprising:

command input means connected to each of said relaying stations;

route information rewrite processing means responsive to reception of a command inputted from said command input means connected to said relaying station to thereby replace the learned route information contained in said routing table by route information non-exchangeable between said relaying stations; and said route information rewrite processing means comprising:
  retrieval processing means for retrieving from said routing table a port identification number designated by a command inputted through said command inputted through said command input means;
  a port management table for containing information concerning the port retrieved by said retrieval processing means; and
  flag change-over means for changing a route information exchange flag contained in said port management table.

5. A communication network system according to claim 4, said routing table being composed of a dynamic routing table and a static routing table, each of said dynamic routing table and said static routing table containing a destination area indicating destinations of the relaying station, a next-hop area containing next-hop information indicating a network address, an area indicating times for exchanges of the route information and a learning port identification number area containing identification numbers of ports through which the route information has been learned in the course of exchange of the route information;
wherein when the port designated by said retrieval processing means coincides with the port contained in said learning port identification number area of said dynamic routing table, then the information concerning the destination, the next hop and the times for exchanges of the route information of the relaying station relevant to said port of said learning port identification number area are transported to relevant empty areas of said static routing table from said dynamic routing table, whereby said static routing table is set as the routing table for the route information which is not to be exchanged among said relaying stations.

6. A communication network system including a plurality of networks interconnected via a plurality of relaying stations each performing a program controllable process to relay communication data, said program controllable process comprising:
  a routing table having route information for determining a route to transfer the communication data;
  learning processing means exchanging the route information contained in said routing table among the individual relaying stations in accordance with the route information of said routing table to acquire the route information by the exchange;
  route information transform processing means for transforming the route information contained in said routing table as acquired by the learning means into route information non-exchangeable among the individual relaying stations;
  said route information transforming means comprising:
    command input means connected to the relaying station;
    transmission processing means responsive to reception of a command inputted through said command input means connected to said relaying station, to thereby send a frame indicating suspension of exchange of the route information to a counterpart relaying station with which route information is being exchanged;
    route information rewrite processing means responsive to one of reception of said frame and reception of response for said frame, to thereby replace the learned route information contained in said routing table by route information non-exchangeable between the relay stations; and
    said transmission processing means including:
      transmission/reception processing means for transmitting from the port designated by the port identification number designated by a command inputted through said command input means a unique frame destined to be exchanged with a counterpart relaying station and indicating suspension of exchange of said route information to said counterpart relaying station with which exchange of the route information is being carried out, and receiving a response for said unique frame from said counterpart relaying station,
      said route information rewrite processing means including:
        retrieval processing means for retrieving from said routing table a port identification number designated by a command inputted through said command input means;
        a port management table for containing information concerning the port retrieved by said retrieval processing means; and
        flag change-over means for changing a route information exchange flag contained in said port management table.

7. A communication network system according to claim 6, said routing table being composed of a dynamic routing table and a static routing table, each of said dynamic routing table and said static routing table containing a destination area indicating destinations of the relaying station, a next-hop area containing next-hop information indicating a network address, an area indicating times for exchanges of the route information and a learning port identification number area containing identification numbers of ports through which the route information has been learned in the course of exchange of the route information;
wherein when the port designated by said retrieval processing means coincides with the port contained in said learning port identification number area of said dynamic routing table, then the information concerning the destination, the next hop and the times for exchanges of the route information of the relaying station relevant to said port of said learning port identification number area are transported to relevant empty areas of said static routing table from said dynamic routing table, whereby said static routing table is set as the routing table for the route information non-exchangeable among said relaying stations.

8. A communication network system including a plurality of networks interconnected via a plurality of relaying stations each performing a program controllable process to relay communication data, said program controllable process comprising:
  a routing table having route information for determining a route to transfer the communication data;
  learning processing means exchanging the route information contained in said routing table among the individual relaying stations in accordance with the route information of said routing table to acquire the route information by the exchange;
  route information transform processing means for transforming the route information contained in said routing table as acquired by the learning means into route information non-exchangeable among the individual relaying stations;

said route information transforming means comprising:

port identifying means for identifying use-enabled interconnecting ports after communication-ready state has been established between said relaying stations; and route information rewrite processing means for replacing the learned route information contained in the routing table of each of said relaying station by route information non-exchangeable between said relay stations by route information non-exchangeable between said relaying stations after lapse of a predetermined time from the identification of said use-enabled interconnecting ports; and said route information rewrite processing means comprising:

time measurement processing means for identifying a port to be enabled by said port identifying/enabling means to thereby measure a time period during which said route information is being exchanged, starting from a predetermined time point, and outputting an end signal indicating lapse of a predetermined time period from the start of said measurement, said route information rewrite processing means including:

retrieval processing means responsive to said end signal for thereby retrieving from said routing table said identified port;

a port management table for containing information concerning the port retrieved by said retrieval processing means; and flag change-over means for changing a route information exchange flag contained in said port management table.

9. A communication network system according to claim 8, said routing table being composed of a dynamic routing table and a static routing table, each of said dynamic routing table and said static routing table containing a destination area indicating destinations of the relaying station, a next-hop area containing next-hop information indicating a network address, an area indicating times for exchanges of the route information and a learning port identification number area containing identification numbers of ports through which the route information has been learned in the course of exchange of the route information;

wherein when the port designated by said retrieval processing means coincides with the port contained in said learning port identification number area of said dynamic routing table, then the information concerning the destination, the next hop and the times for exchanges of the route information of the relaying station relevant to said port of said learning port identification number area are transported to relevant empty areas of said static routing table from said dynamic routing table, whereby said static routing table is set as the routing table for the route information which is not to be exchanged among said relaying stations.

10. A network relaying station performing a program controllable process to relay communication data, said program controllable process comprising:

a routing table having route information for determining a route to transfer the communication data;

learning processing means exchanging the route information contained in said routing table among the individual relaying stations in accordance with the route information of said routing table to acquire the route information by the exchange;

route information transform processing means for transforming the route information contained in said routing table as acquired by the learning means into route information non-exchangeable among the individual relaying stations; and wherein said route information transforming means comprising:

port identifying means for identifying use-enabled interconnecting ports after communication-ready state has been established between said relaying stations;

measurement processing means for measuring the number of changes in a number of times the route information has been exchanged with a counterpart relaying station per unit time period;

transmission processing means for sending a frame indicating suspension of the exchange of the route information to the counterpart relaying station with which the route information is being exchanged when the number of changes in said number of times the route information has been exchanged becomes equal to a predetermined value; and route information rewrite processing means responsive to one of reception of said frame and reception of response for said frame, to thereby replace the learned route information contained in said routing table by route information non-exchangeable between the relaying stations.

11. A network relaying station performing a program controllable process to relay communication data, said program controllable process, comprising:

a routing table having route information for determining a route to transfer the communication data;

learning processing means exchanging the route information contained in said routing table among the individual relaying stations in accordance with the route information of said routing table to acquire the route information by the exchange; and route information transform processing means for transforming the route information contained in said routing table as acquired by the learning means into route information non-exchangeable among the individual relaying stations;

said relaying station comprising:

route information rewrite processing means responsive to reception of a command inputted from a command input means connected to said relaying station to thereby replace the learned route information contained in said routing table by route information non-exchangeable between said relaying stations;

wherein said route information rewrite processing means comprises:

retrieval processing means for retrieving from said routing table a port identification number designated by a command inputted through said command inputted through said command input means;

a port management table for containing information concerning the port retrieved by said retrieval processing means; and flag change-over means for changing a route information exchange flag contained in said port management table.

* * * * *